(12) United States Patent
Oh et al.

(10) Patent No.: US 7,746,204 B2
(45) Date of Patent: Jun. 29, 2010

(54) FIELD COIL ASSEMBLY OF ELECTROMAGNETIC CLUTCH

(75) Inventors: Sung-Taeg Oh, Daejeon (KR);
Dae-Yong Park, Daejeon (KR);
Sung-Won Cho, Daejeon (KR)

(73) Assignee: Halla Climate Control Corp., Daejeon (KR)

(*) Notice: Subject to any disclaimer, the term of this patent is extended or adjusted under 35 U.S.C. 154(b) by 0 days.

(21) Appl. No.: 12/482,260

(22) Filed: Jun. 10, 2009

(65) Prior Publication Data

US 2009/0309681 A1   Dec. 17, 2009

(30) Foreign Application Priority Data

Jun. 16, 2008   (KR) .................. 10-2008-0056368

(51) Int. Cl.
*H01F 5/00* (2006.01)
*F16D 19/00* (2006.01)
*F16D 27/00* (2006.01)
*F16D 37/02* (2006.01)
*H01F 27/02* (2006.01)
*H01F 27/04* (2006.01)
*H01F 27/29* (2006.01)
*H01R 4/66* (2006.01)
*H01R 13/648* (2006.01)

(52) U.S. Cl. .................. 335/299; 335/296; 192/84.96; 336/90; 336/107; 336/192; 439/95; 439/101; 439/108

(58) Field of Classification Search ................. 335/296, 335/299; 192/84.1–84.31, 84.9, 84.96; 336/90, 336/96, 105, 107, 192; 439/95, 98, 101, 439/108, 386, 954
See application file for complete search history.

(56) References Cited

U.S. PATENT DOCUMENTS 5,936,828 A * 8/1999 Nolan et al. ................. 361/167
7,138,895 B2 * 11/2006 Chung ........................ 335/299
2007/0017770 A1 * 1/2007 Oh et al. ................. 192/84.961

FOREIGN PATENT DOCUMENTS

KR      10-0580433 B1    5/2006
KR      10-2007-0107467 A   11/2007

* cited by examiner

*Primary Examiner*—Elvin G Enad
*Assistant Examiner*—Mohamad A Musleh
(74) *Attorney, Agent, or Firm*—Birch, Stewart, Kolasch & Birch, LLP

(57) ABSTRACT

The present invention relates to a field coil assembly of an electromagnetic clutch for a compressor. A field coil assembly according to the present invention includes a field coil member 20 having a coil wire 22 extending outward; a power connecting member 30 having a sleeve 35 with a terminal 40 protruding out, the terminal electrically connecting the coil wire 22 to an external power source; a flange 28 coupled to one side of the field coil member 20 with the coil wire 22 drawn therefrom, the flange 28 having a catching portion 29 coupled with the sleeve 35, the flange 28 having electric conductivity; and a ground terminal 50 provided in the sleeve 35 and electrically connected to the terminal 40, the ground terminal 50 having at least a portion contacted with the catching portion 29.

5 Claims, 8 Drawing Sheets

FIELD COIL ASSEMBLY OF ELECTROMAGNETIC CLUTCH

BACKGROUND OF THE INVENTION

1. Field of the Invention

The present invention relates to a field coil assembly of an electromagnetic clutch, and more particularly, to a field coil assembly of an electromagnetic clutch in which a grounding structure and an interconnection structure between a terminal of a power supply connector and a field coil are improved.

2. Description of the Related Art

A compressor of a refrigerant system for a vehicle operates and stops under the control of an electromagnetic clutch that regulates rotating power transferred from a vehicle engine to a rotating shaft of the compressor.

As shown in FIG. 1, a general electromagnetic clutch 101 includes a pulley 103 rotating with power received from a vehicle engine, a disc and hub assembly 105 coupled to a rotating shaft 109 of a compressor 107 so as to be attached to or detached from the pulley 103, and a field coil assembly 110 for attaching or detaching the disc and hub assembly 105 to or from the pulley 103 according to supply or interruption of power.

If power is supplied to the field coil assembly 110, the electromagnetic clutch 101 forms a magnetic field by electromagnetic force so that the disc and hub assembly 105 is attracted attached to a frictional surface of the pulley 103, thereby operating the compressor 107. Then, if the supply of power to the field coil assembly 110 is interrupted, the disc and hub assembly 105 is separated from the frictional surface of the pulley 103 due to the released electromagnetic force and elastically repulsive force of the disc and hub assembly 105, whereby the compressor 107 stops operating.

In other words, the compressor 107 operates or stops under the control of the electromagnetic clutch 101 according to whether or not to supply power to the field coil assembly 110.

The field coil assembly 110 employed in the conventional electromagnetic clutch 101 includes a field coil member 120 for generating electromagnetic force, a power connecting member 130 for connecting an external power source to the field coil member 120, and a ground terminal 150 for the field coil member 120, as shown in FIGS. 2 and 3.

Now, the field coil member 120, the power connecting member 130 and the ground terminal 150 will be described in detail.

First, the field coil member 120 includes a coil body 121 having a coil wire 122 wound in a ring shape, and a bobbin 123 receiving the coil body 121 and having a coil drawn-out portion 124 formed in a region thereof to expose both ends of the coil wire 122 that extends outward from the coil body 121.

In addition, the field coil member 120 is provided with a core ring 125 that receives the bobbin 123 having the coil body 121 received therein and is inserted into a coil receiving space of the pulley 103.

The field coil member 120 is provided with a core ring cover 127. The core ring cover 127 serves to seal an open side of the core ring 125, which receives the coil body 121 and the bobbin 123.

The field coil member 120 is provided with a flange 128. The flange 128 is coupled to one side of the core ring 125, and the flange 128 has catching portions 129 formed in a region corresponding to the coil drawn-out portion 124 of the bobbin 123, wherein the catching portions 129 are caught to or released from a sleeve 135 of the power connecting member 130, which will be described later.

In addition, the power connecting member 130 includes a connector 131 connected to an external power source, and the sleeve 135 electrically connected to the connector 131 and having terminals 140 connected to the exposed ends of the coil wire 122 of the field coil member 120.

Here, as shown in FIGS. 3a and 3b, the power connecting member 130 is configured such that the connector 131 connected to an external power source A (see FIG. 1) is formed integrally with the sleeve 135, and the terminals 140 is provided within the sleeve 135 by an insert injection molding process.

Alternatively, as shown in FIGS. 4a and 4b, upper and lower sleeves 135a and 135b may be coupled with each other to form a sleeve 135, and terminals 140 interposed between the upper and lower sleeves 135a and 135b may be electrically connected to a power supply line 133 of the connector 131.

The sleeve 135 of the power connecting member 130 has hooks 137 formed at both sides thereof in a width direction, wherein the hooks 137 are caught and engaged to the catching portions 129 formed on the flange 128 of the field coil member 120.

In addition, the terminals 140 for electrically connecting the coil body 121 of the field coil to the external power source protrude between the pair of hooks 137. Here, a connection end of the terminal 140 is open at one side thereof to have a '⊂' shape such that both the ends of the coil wire 122 of the field coil member 120 may be inserted therein.

Meanwhile, the ground terminal 150 is provided at one end of a ground lead wire 151 extending from the coil body 121 of the field coil member 120 to the outside through the bobbin 123 and the core ring 125. At this time, a bushing 153 having an airtight property is coupled to the portions of the bobbin 123 and the core ring 125 through which the ground lead wire 151 passes, thereby allowing the ground lead wire 151 to be drawn out with airtight.

An assembling process of the field coil assembly 110 of the conventional electromagnetic clutch 101 so configured will be described. When the sleeve 135 of the power connecting member 130 is inserted between the catching portions 129 formed on the flange 128, the hooks 137 at both the sides of the sleeve 135 are caught to the catching portions 129, and both the ends of the coil wire 122 of the field coil member 120 are inserted into the '⊂' shaped connection ends of the terminals 140.

In this state, the '⊂' shaped connection ends of the terminals 140 are compressed by means of a press tool (not shown), and the compressed portions are treated through a high frequency fusing process. Then, the electrically coupling state of the end of the coil wire 122 and the connection end of the terminal 140 is maintained.

Then, the electrically connected portions between the coil wire 122 and the terminals 140 of the sleeve 135 and their surroundings are molded by an insert injection molding process, thereby preventing the electric connection portions from being exposed to the outside and penetrated by moisture. Thus, the field coil assembly 110 is completely assembled.

In addition, the ground terminal 150 is grounded to one side of a vehicle body using a coupling part (not shown), such as a screw or rivet.

However, in the field coil assembly 110 of such a conventional electromagnetic clutch 101, the '⊂' shaped connection end of the terminal 140 of the sleeve 135 has a certain height and surround a vertical range of the end of the coil wire 122, so that the molded portion M formed on the electric connection portions of the coil wire 122 and the terminal 140 of the sleeve 135 and their surroundings has a great height h.

More specifically, the height h of the molded portion M is at least a sum of the height of the '⊏' shaped connection end of the terminal 140 and a length of the coil wire 122 drawing upward from the '⊏' shaped connection end.

Due to the height of the molded portion M, the overall appearance of the field coil assembly 110 is deteriorated.

Also, in a process of mounting the field coil assembly 110 to the coil receiving space of the pulley 103, the molded portion M of the sleeve 135 may easily interfere with surroundings due to its height h, thereby deteriorating the mountablity of the field coil assembly 10. Also, the volume occupied by the field coil assembly 110 in a vehicle is increased, thereby deteriorating a space utilization of a vehicle.

In addition, the field coil assembly 110 of such a conventional electromagnetic clutch 101 is provided with the additional ground terminal 150, which needs additional parts such as the ground lead wire 151 and the bushing 153 in addition to the ground terminal 150, thereby increasing the number of parts and assembling processes.

Also, since the ground terminal 150 grounded to the vehicle body is exposed to the outside, the exposed portion easily corrodes, thereby deteriorating the durability of the field coil assembly 110.

SUMMARY OF THE INVENTION

The present invention is conceived to solve the aforementioned problems in the prior art. An object of the present invention is to reduce the height of a coupling portion between a terminal of a sleeve and a coil wire extending from a coil body.

Another object of the present invention is to contact a portion of the terminal of the sleeve to a hook for fixing a power connecting member, thereby making ground connection.

According to an aspect of the present invention for achieving the objects, there is provided a field coil assembly of an electromagnetic clutch, which comprises a field coil member having a coil wire extending outward; a power connecting member having a sleeve with a terminal protruding out, the terminal electrically connecting the coil wire to an external power source; a flange coupled to one side of the field coil member with the coil wire drawn therefrom, the flange having a catching portion coupled with the sleeve, the flange having electric conductivity; and a ground terminal provided in the sleeve and electrically connected to the terminal, the ground terminal having at least a portion contacted with the catching portion.

The portion of the terminal that protrudes out of the sleeve may include a support being in contact with a drawn-out side of the coil wire; and a bent portion bent at a position adjacent to the support to have height different from the support, the bent portion being spaced from the drawn side of the coil wire, wherein the portion of the coil wire that draws from the field coil member is inserted between the support and the bent portion and electrically connected to the terminal.

A horizontal slot may be formed at a gap between the support and the bent portion, and the bent portion may be bent in a state where the portion of the coil wire that draws from the field coil member is inserted into the horizontal slot, thereby electrically connecting the coil wire to the terminal.

The sleeve may have a hook that is caught to or released from the catching portion, and the ground terminal may be at least partially exposed out of the hook.

The terminal and the ground terminal may be integrally formed.

BRIEF DESCRIPTION OF THE DRAWINGS

The features and advantages of the present invention will become apparent from the following description in conjunction with the accompanying drawings, in which.

DESCRIPTION OF THE PREFERRED EMBODIMENT

Hereinafter, a preferred embodiment of a field coil assembly of an electromagnetic clutch according to the present invention will be described in detail with reference to the accompanying drawings.

Figure 5A:
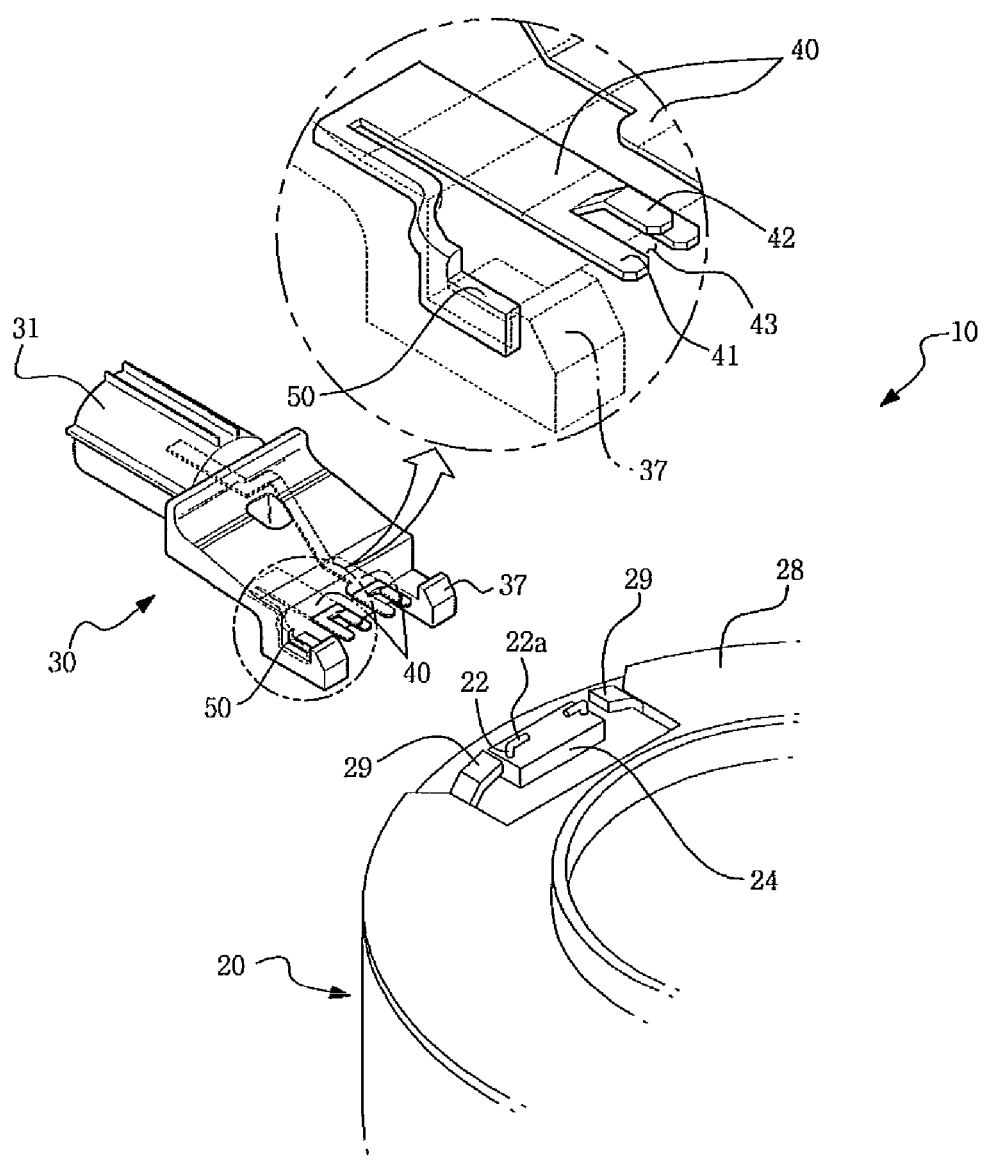
FIGS. 5a and 5b are perspective views showing that a field coil member and a power connecting member of a preferred embodiment of a field coil assembly of an electromagnetic clutch according to the present invention are separated from or coupled to each other.
Figure 5B:
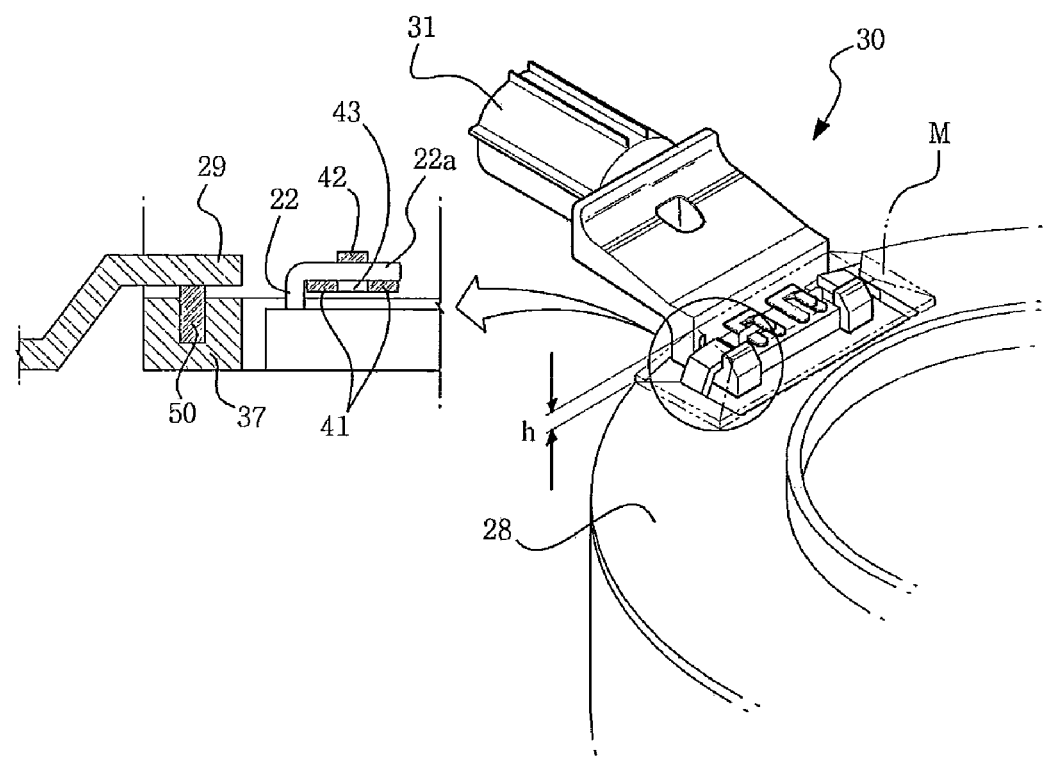

FIGS. 5a and 5b are perspective views showing that a field coil member and a power connecting member of a preferred embodiment of a field coil assembly of an electromagnetic clutch according to the present invention are separated from or coupled to each other. For reference, the field coil assembly of this embodiment is similar to the conventional field coil assembly except for a field coil member 20 and a power connecting member 30, so that details of the similar components will be omitted.

As shown in the figures, a field coil assembly 10 of an electromagnetic clutch according to the present invention includes the field coil member 20 and the power connecting member 30, similarly to the field coil assembly 110 of the aforementioned conventional electromagnetic clutch.

Figure 2:
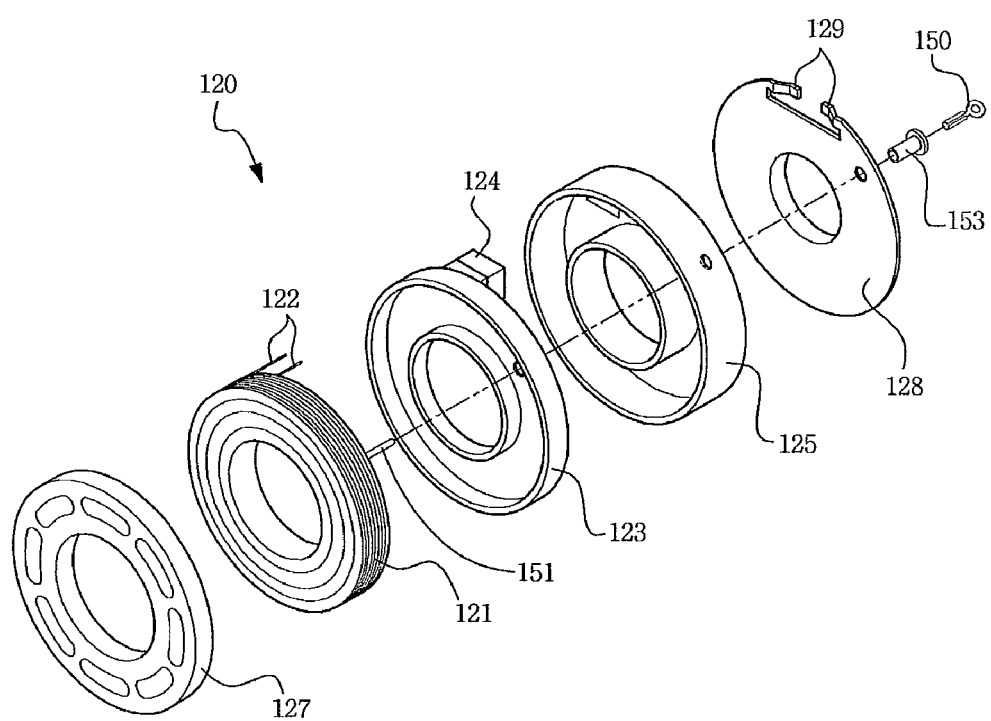
FIG. 2 is an exploded perspective view of a field coil member employed in the field coil assembly of FIG. 1.
Figure 3A:
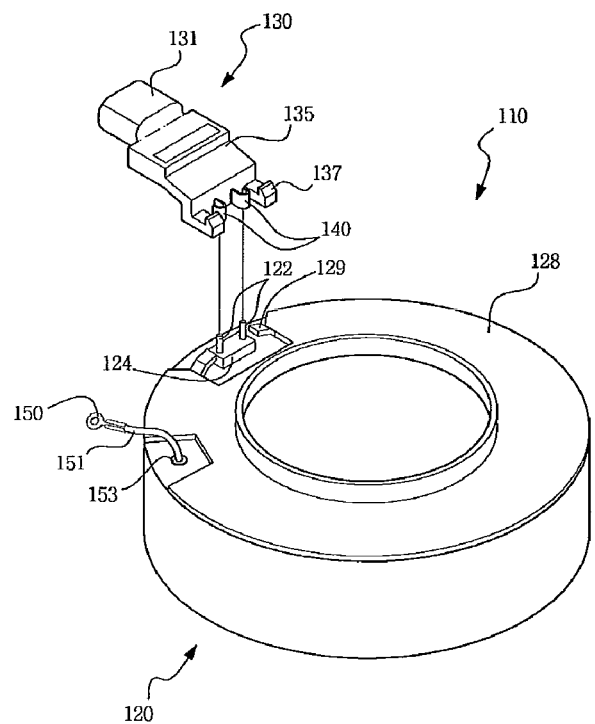
FIGS. 3a and 3b are perspective views showing that the field coil member and a power connecting member of the conventional field coil assembly are separated from or coupled to each other.
Figure 3B:
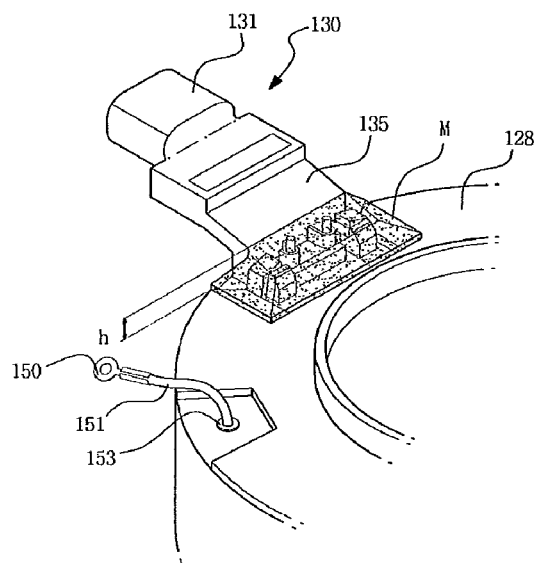
Figure 4A:
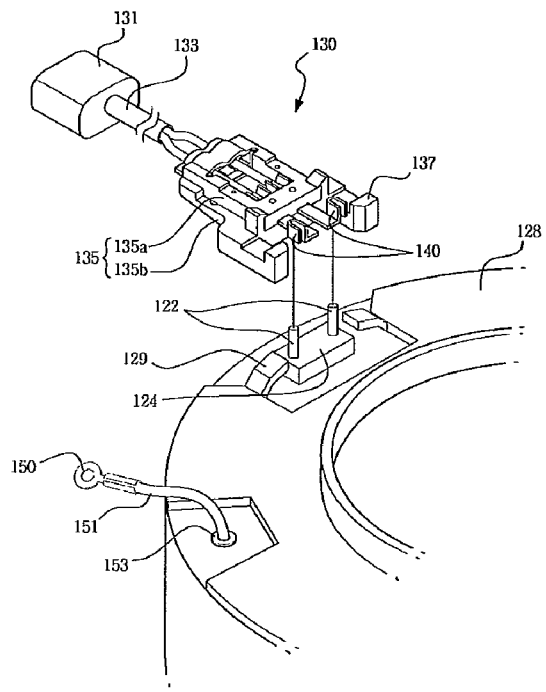
FIGS. 4a and 4b are perspective views showing that the field coil member and another example of the power connecting member of the conventional field coil assembly are separated from or coupled to each other.
Figure 4B:
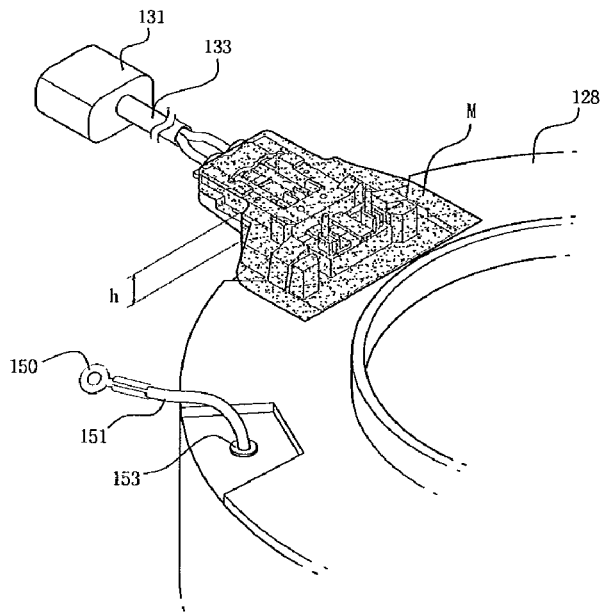

Both ends of a coil wire 22 extending outward through a coil drawn-out portion 24 of a bobbin (see reference numeral 124 in FIG. 2) from a coil body 21 are a part of a wire wound on the coil body 21 and protrude outward at a region adjacent to catching portions 29 of a flange 28 of the field coil member 20.

At this time, both the ends of the coil wire 22 are drawn out in an orthogonal direction to an upper surface of the coil drawn-out portion 24 of the field coil member 20, and at least a part 22a of a drawn-out portion of the coil wire 22 is bent in a direction parallel to the upper surface of the coil drawn-out portion 24.

The bent portion 22a of each end of the coil wire 22 is inserted between supports 41 and a bent portion 42 of each terminal 40, which will be described later and thus electrically connected to the terminal 40.

Meanwhile, the power connecting member 30 includes a connector 31 and a sleeve 35. The connector 31 and the sleeve 35 may be integrally provided or separately prepared and then assembled. In other words, the sleeve 35 may be considered as a part of the connector 31.

The terminals 40 are inserted into the sleeve 35. The terminals 40 at least partially protrude out of the sleeve 35. More specifically, the portions of the terminals 40, which protrude out of the sleeve 35, extend in parallel to the upper surface of the coil drawn-out portion 24.

At this time, the portion of the terminal 40 protruding out of the sleeve 35 is provided with the supports 41 and the bent portion 42. The supports 41 are in contact with the upper surface of the coil drawn-out portion 24, and the bent portion 42 is bent to have a height different from that of the supports 41.

In other words, the bent portion 42 is formed to be spaced apart from the upper surface of the coil drawn-out portion 24, and the bent portion 42 is formed by partially bending a cut portion of the terminal 40. At this time, in this embodiment, the bent portion 42 is formed by bending the portion of the terminal 40 in an upper or horizontal direction. However, the bent portion 42 may also be formed by bending the portion of the terminal 40 upward at a certain angle.

As mentioned above, the supports 41 and the bent portion 42 are provided not to be flush with each other, so that a predetermined space is formed therebetween and allows the coil wire 22 to be inserted therein.

That is, as the sleeve 35 is viewed from its side, a generally '⊂' shaped space is defined between the supports 41 and the bent portion 42. As shown in FIG. 5a, a central region of a drawn-out portion of the terminal 40 is cut, bent upward, and then bent horizontally toward the coil wire 22, thereby forming the bent portion 42 and thus defining the space.

At this time, the supports 41 are formed at both sides of the bent portion 42, and a slot 43 is formed between the pair of supports 41 by partially cutting the terminal into the bent portion 42. The supports 41 may not be provided at both sides of the bent portion 42, and one support may be provided at any one side of the bent portion 42. Alternatively, a plurality of the supports 41 and bents 42 may be provided alternately.

As mentioned above, the bent portion 22a of the coil wire 22 is inserted into the space between the bent portion 42 and the supports 41, and then an end of the bent portion 42 is pressed and bent, thereby electrically connecting the coil wire 22 to the terminal 40.

As shown in the figures, the terminals 40 are inserted into the sleeve 35 through an insert injection molding process.

Also, in this embodiment, the power connecting member 30 is a direct sleeve type, wherein the connector 31 connected to an external power source is formed integrally at one side of the sleeve 35.

Meanwhile, a ground terminal 50 is provided in the sleeve 35. The ground terminal 50 is mounted in the sleeve 35 to be electrically connected to any one of the terminals 40, and at least a portion of the ground terminal 50 is exposed out of a hook 37 of the sleeve 35.

At this time, if the hook 37 of the sleeve 35 is caught to one of the catching portions 29 formed on the flange 28 of the field coil member 20, the portion of the ground terminal 50 exposed out of the hook 37 is grounded to the catching portion 29 of the flange 28.

The ground terminal 50 may be prepared as an additional part from the terminal 40. However, as shown in FIG. 5a, it is preferred that one end of the ground terminal 50 be integrally connected to the terminal 40 for reducing the number of parts and assembling processes.

The flange 28, to which the ground terminal 50 is grounded, and a core ring (see reference numeral 125 in FIG. 2) adjacent thereto are preferably coated with metal with electric conductivity such as zinc and chromate (III).

In a case where a resin coating is formed on a surface of the flange 28 to which the ground terminal 50 is grounded, the catching portion 29 of the flange 28 and the flange 28 are at least partially peeled, respectively. This is to allow the ground terminal 50 to be grounded to the catching portion 29 and at the same time to make a portion of the peeled flange 28 be grounded to a vehicle body.

Hereinafter, another embodiment of the field coil assembly of an electromagnetic clutch according to the present invention will be described with reference to the accompanying drawings. For reference, the same component as the previous embodiment will not be described again, and only different portions will be described.

Figure 6A:
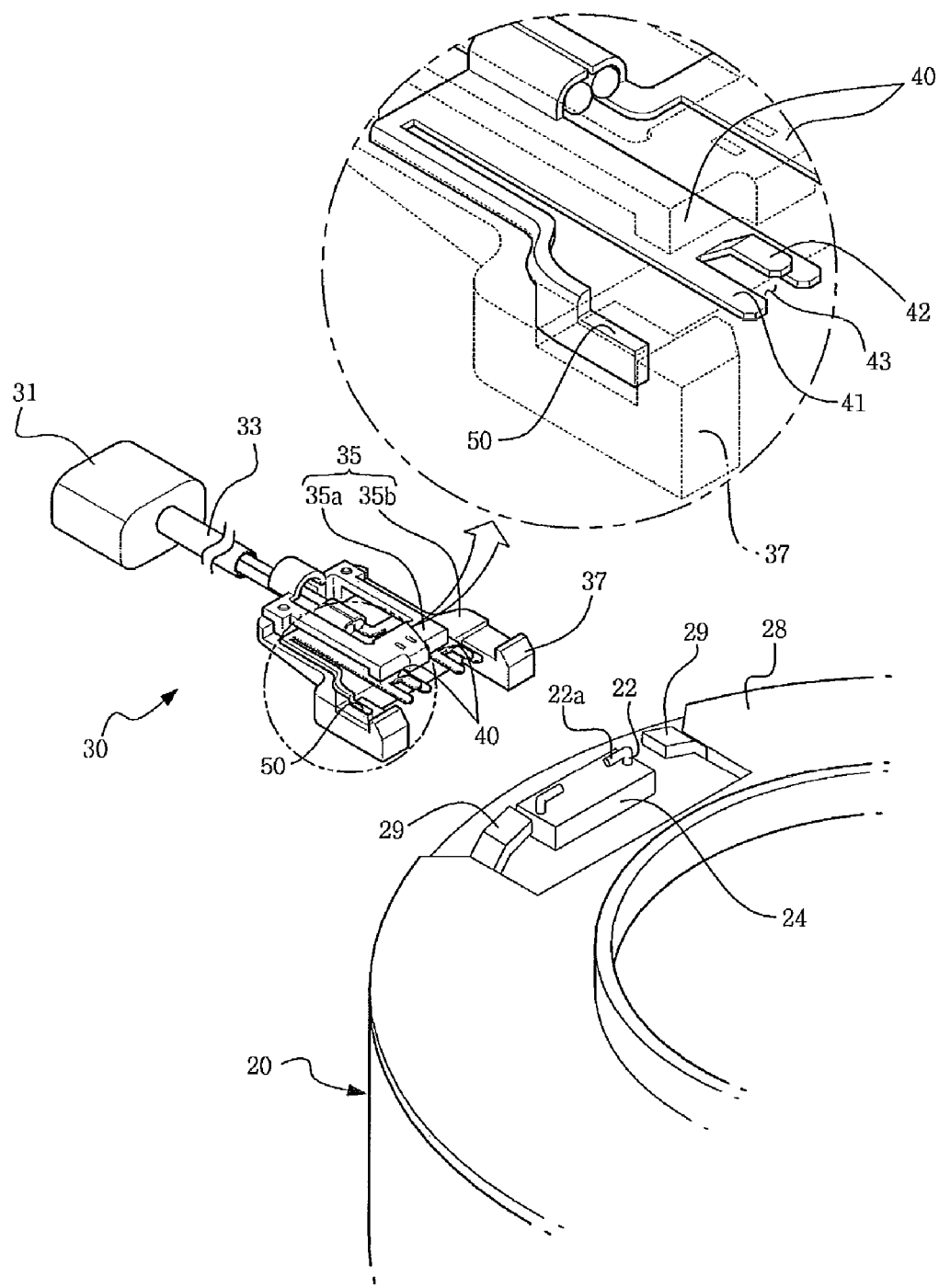
FIGS. 6a and 6b are perspective views showing that a field coil member and a power connecting member of another embodiment of the field coil assembly of an electromagnetic clutch according to the present invention are separated from or coupled to each other.
Figure 6B:
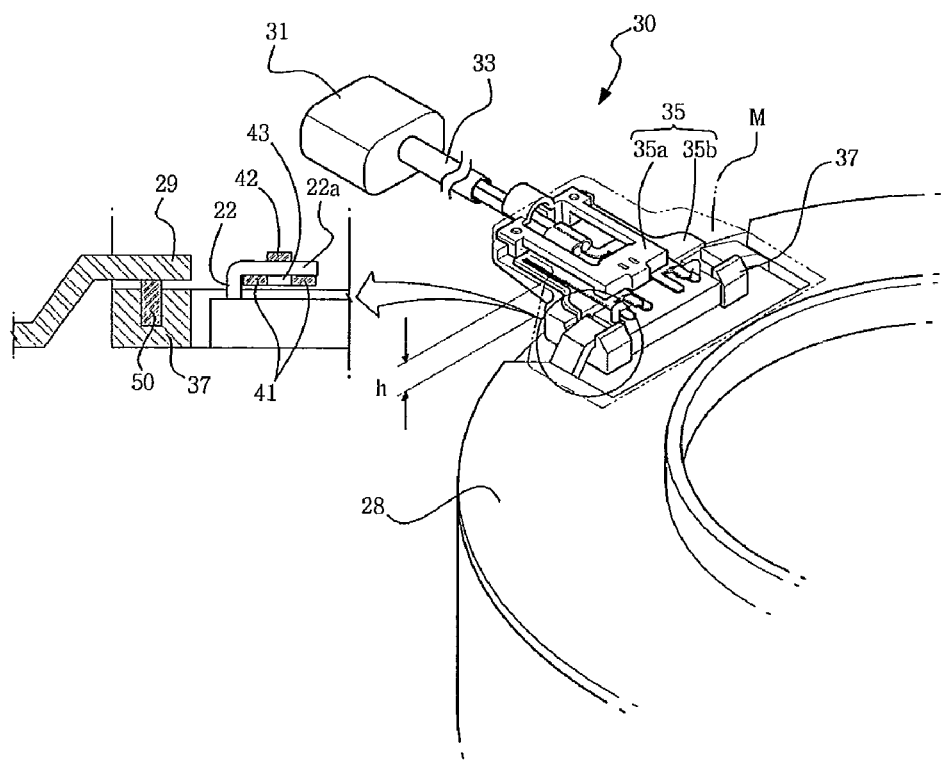

FIGS. 6a and 6b are perspective views showing that a field coil member and a power connecting member of another embodiment of the field coil assembly according to the present invention are separated from or coupled to each other.

Referring to the figures, the sleeve 35 is configured by coupling upper and lower sleeves 35a and 35b to each other. In other words, the upper and lower sleeves 35a and 35b separately prepared are coupled to each other to form the single sleeve 35, and a power supply line 33 of the connector 31 is electrically connected to the terminals 40 between the upper and lower sleeves 35a and 35b.

That is, in this embodiment, the power connecting member 30 is a pig tail type wherein the connector 31 to be connected to an external power source is connected to the sleeve 35 through the power supply line 33.

At this time, similarly to the previous embodiment, each terminal 40 is provided with the supports 41 and the bent portion 42, and one end of the coil wire 22 is inserted therebetween.

Hereinafter, the process of assembling the field coil assembly of an electromagnetic clutch according to the embodiment of the present invention will be explained. For reference, the following description is based on FIGS. 5a and 5b.

First, an assembler moves the power connecting member 30 in a state where the sleeve 35 is directed to the catching portions 29 of the field coil member 20. In this process, the hooks 37 at both the sides of the sleeve 35 are caught to the catching portions 29, so that the power connecting member 30 is coupled to the field coil member 20.

Meanwhile, the hooks 37 are caught to the catching portions 29, and at the same time, each end of the coil wire 22 is inserted between the bent portion 42 and the supports 41 of the terminal 40. More specifically, each bent portion 22a of the coil wire 22 is inserted into the gap between the bent portion 42 and the supports 41 of the terminal 40.

In such a state, if the assembler presses and bends the bent portion 42, the bent portion 42 is plastically deformed toward the upper surface of the coil drawn-out portion 24. Accordingly, the bent portion 22a of the coil wire 22 positioned between the bent portion 42 and the supports 41 is engaged and fixed between the bent portion 42 and the supports 41, and the terminal 40 is electrically connected to the coil wire 22.

As mentioned above, in the present invention, the bent portion 42 is bent toward the coil drawn-out portion 24 in a state where the bent portion 22a of the coil wire 22 is inserted into the gap between the bent portion 42 and the supports 41 of the terminal 40, so that the coupling portion between the terminal 40 and the coil wire 22 is relatively reduced in height.

More specifically, the height of the coupling portion between the terminal 40 and the coil wire 22 becomes smaller than or equal to a sum of the thickness of the coil drawn-out portion 24, the thickness of the terminal 40 and the thickness of the coil wire 22.

Meanwhile, the ground terminal 50 exposed above the hook 37 is brought into contact with one of the catching portions 29. In other words, as the hooks 37 of the sleeve 35 are caught to the catching portions 29 of the field coil member 20, a portion of the ground terminal 50 is naturally brought into contact with one of the catching portions 29. Accordingly, the ground terminal 50 is electrically connected to the catching portion 29, and thus, the field coil assembly may be grounded without additional parts for grounding.

Then, in this state, the assembler molds the coupling portions between the terminals 40 of the sleeve 35 and the coil wire 22 and their surroundings into by an insert injection molding process. In this way, the coupling portions between the terminals 40 of the sleeve 35 and the coil wire 22 are shielded against the outside, so that moisture and other foreign materials cannot penetrate the coupling portions.

Figure 1:
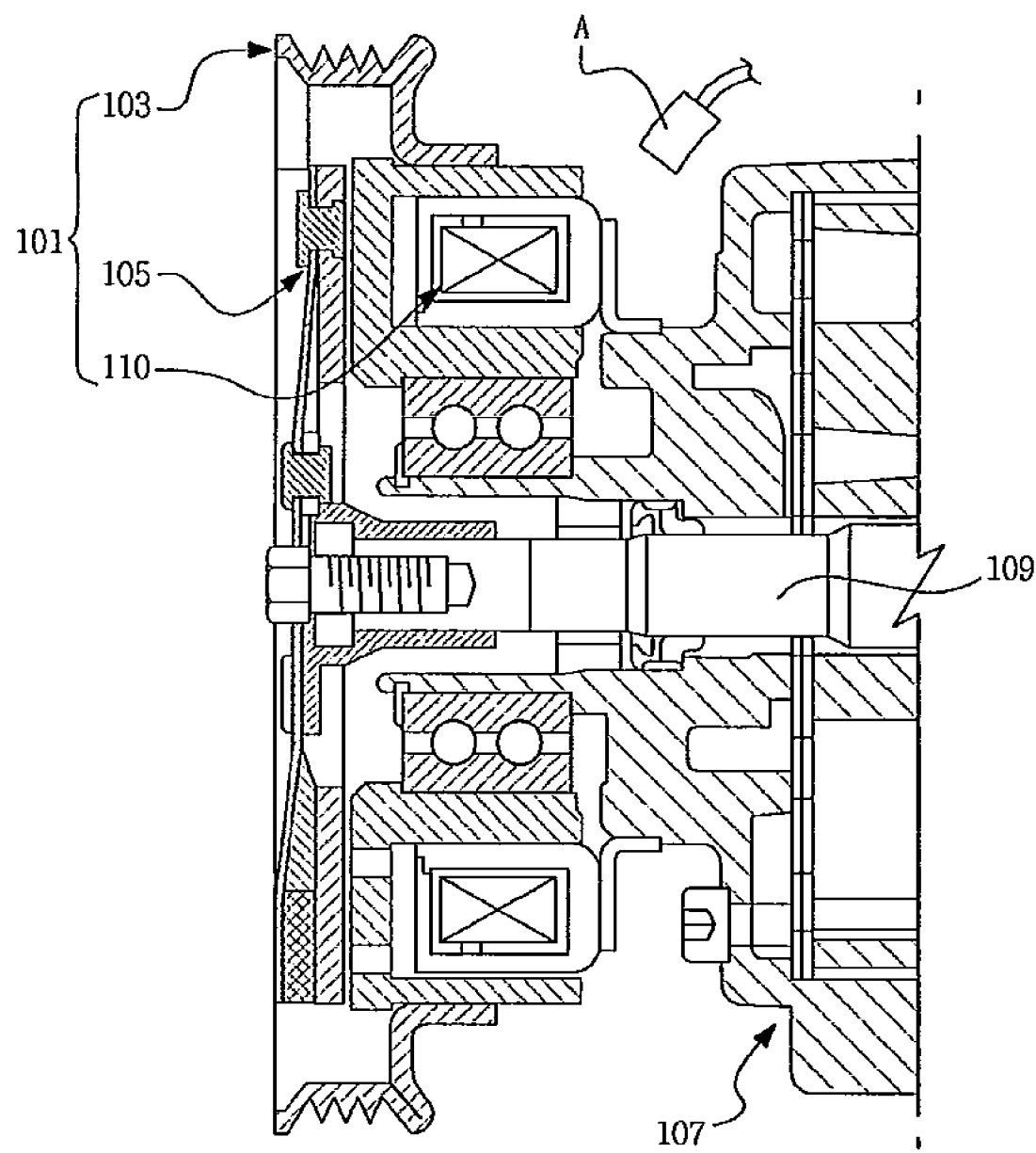
FIG. 1 is a sectional view showing that a generally electromagnetic clutch and a field coil assembly are coupled to a compressor.

Accordingly, the overall appearance of the field coil assembly is not deteriorated due to the height of the molded portion M. Also, when the field coil assembly is mounted in a coil receiving space of a pulley (see reference numeral 103 in FIG. 1), the field coil assembly may be easily mounted without interference with surroundings since the molded portion M of the sleeve 35 has a low height h.

Meanwhile, if external power is supplied to the field coil member 20 through electric connection between the terminals 40 and the coil wire 22, a magnetic field is formed due to electromagnetic force of the field coil member 20, so that a disc and hub assembly is attached to a frictional surface of the pulley by suction, thereby operating the compressor.

The scope of the present invention is not limited to the embodiment described above but is defined by the appended claims. It will be apparent that those skilled in the art can make various modifications and changes thereto within the scope of the invention defined by the claims.

In the present invention, the supports and the bent with different heights are provided at the terminal of the sleeve of the field coil member, and the bent is plastically deformed while one end of the coil wire is inserted therebetween, thereby electrically connecting the coil wire and the terminal. Thus, the coupling portion between the terminal and the coil wire has a height equal to or smaller than a sum of the thickness of the terminal and the thickness of the coil wire. Accordingly, the overall height of the field coil member is relatively reduced, so that the overall appearance of the field coil assembly is enhanced.

In addition, since the height of the coupling portion between the terminal and the coil wire is reduced, the field coil assembly may be assembled to a pulley with less interference with surroundings, so that improvement in assembling of the field coil assembly of an electromagnetic clutch is expected.

Further, according to the present invention, if the hooks of the sleeve are caught to the catching portions of the field coil member, the ground terminal integrally provided to one of the terminals is naturally contacted to one of the catching portions to make grounding. Thus, there is no need for any additional terminal for grounding, thereby decreasing the number of parts and assembling processes.

Furthermore, since the ground terminal is also molded together with the coupling portions between the terminals and the coil wire, the ground terminal is not exposed to the outside and does not corrode. Thus, there is an effect in that the durability of the field coil assembly of an electromagnetic clutch is improved.

Also, according to the present invention, the power connecting member is coupled to the field coil member in a direction in which the coil wire is inserted into the terminal, so that the coil wire may be naturally inserted between the supports and the bent of the terminal while the power connecting member is inserted into the field coil member. Thus, there is an advantageous effect in that the assembling workability of the field coil assembly is improved.

What is claimed is:

1. A field coil assembly of an electromagnetic clutch, comprising:
    a field coil member having a coil wire extending outward;
    a power connecting member having a sleeve with a terminal protruding out, the terminal electrically connecting the coil wire to an external power source;
    a flange coupled to one side of the field coil member with the coil wire drawn therefrom, the flange having a catching portion coupled with the sleeve, the flange having electric conductivity; and
    a ground terminal provided in the sleeve and electrically connected to the terminal, the ground terminal having at least a portion contacted with the catching portion.

2. The field coil assembly as claimed in claim 1, wherein the portion of the terminal that protrudes out of the sleeve, includes:
    a support being in contact with a drawn-out side of the coil wire; and
    a bent portion bent at a position adjacent to the support to have height different from the support, the bent portion being spaced from the drawn-out side of the coil wire,
    wherein a portion of the coil wire that draws from the field coil member is inserted between the support and the bent portion and electrically connected to the terminal.

3. The field coil assembly as claimed in claim 1, wherein a horizontal slot is formed at a gap between the support and the bent, and the bent portion is bent in a state where the portion of the coil wire that draws from the field coil member is inserted into the horizontal slot, thereby electrically connecting the coil wire to the terminal.

4. The field coil assembly as claimed in claim 1, wherein the sleeve has a hook that is caught to or released from the catching portion, and the ground terminal is at least partially exposed out of the hook.

5. The field coil assembly as claimed in claim 1, wherein the terminal and the ground terminal are integrally formed.

* * * * *